United States Patent

Iwashiro et al.

Patent Number: 5,905,749
Date of Patent: May 18, 1999

[54] SOLID STATE LASER OSCILLATOR AND MACHINING APPARATUS USING THE SAME

[75] Inventors: Kuniaki Iwashiro; Kenji Kumamoto, both of Tokyo, Japan

[73] Assignee: Mitsubishi Denki Kabushiki Kaisha, Tokyo, Japan

[21] Appl. No.: 08/721,229

[22] Filed: Sep. 26, 1996

[30] Foreign Application Priority Data

Mar. 27, 1996 [JP] Japan .................................. 8-072829

[51] Int. Cl.$^6$ ........................................................ H01S 3/00
[52] U.S. Cl. .......................... 372/33; 372/101; 372/99; 372/105; 372/68; 372/69
[58] Field of Search ............................... 372/101, 33, 69, 372/68, 605, 99

[56] References Cited

U.S. PATENT DOCUMENTS

| | | | |
|---|---|---|---|
| 5,001,718 | 3/1991 | Burrows et al. | 372/101 |
| 5,132,980 | 7/1992 | Connors et al. | 372/101 |
| 5,408,481 | 4/1995 | Scheps | 372/23 |

FOREIGN PATENT DOCUMENTS

| | | |
|---|---|---|
| 428274 | 1/1992 | Japan . |
| 575194 | 3/1993 | Japan . |
| 653576 | 2/1994 | Japan . |

OTHER PUBLICATIONS

Abstract 6–53576, Isao Yoshimura, "Solid State Laser Oscillator", Sumitomo Metal Mining Co. Ltd.
Abstract 4–28274, Shigeo Kubota, "Solid–State Laser Oscillator", Sony Corp.
Abstract 5–75194, Masatoshi Saruwatari, "Wavelength Multimode Synchronous Laser Equipment", Nippon Telegraph and Telephone Corp. (NTT).

Solid–State Laser Engineering, 2nd Edition, Springer–Veralag, pp. 192–193, (cited on p. 1).

"Recent developments in laser resonator design", *Optical and Quantum Electronics*, vol. 23, pp. 1105–1134, 1991.

"Output power limitations in CW single transverse mode Nd: YAG lasers with a rod of large cross–section", *Optical and Quantum Electronics*, vol. 25, pp. 489–500, 1993.

*Primary Examiner*—Leon Scott, Jr.
*Attorney, Agent, or Firm*—Sughrue, Mion, Zinn, Macpeak & Seas, PLLC

[57] ABSTRACT

In a resonating-type solid-state laser oscillator including birefringent a solid-state element containing a laser active medium and providing a plurality of thermal lenses during excitation and reflecting mirrors arranged oppositely to each other on both sides of the solid-state element so that their optical axes are coincident to each other, a prescribed relationship is given among the refractive index and length of the solid-state element, the radii of curvature of the reflection mirrors, the distances between the reflecting mirrors and the solid-state element and the difference between 1/f of the plurality of thermal lenses by owing to birefringence of the solid-state element, so that oscillation areas due to the plurality of thermal lenses are separated from each other.

5 Claims, 8 Drawing Sheets

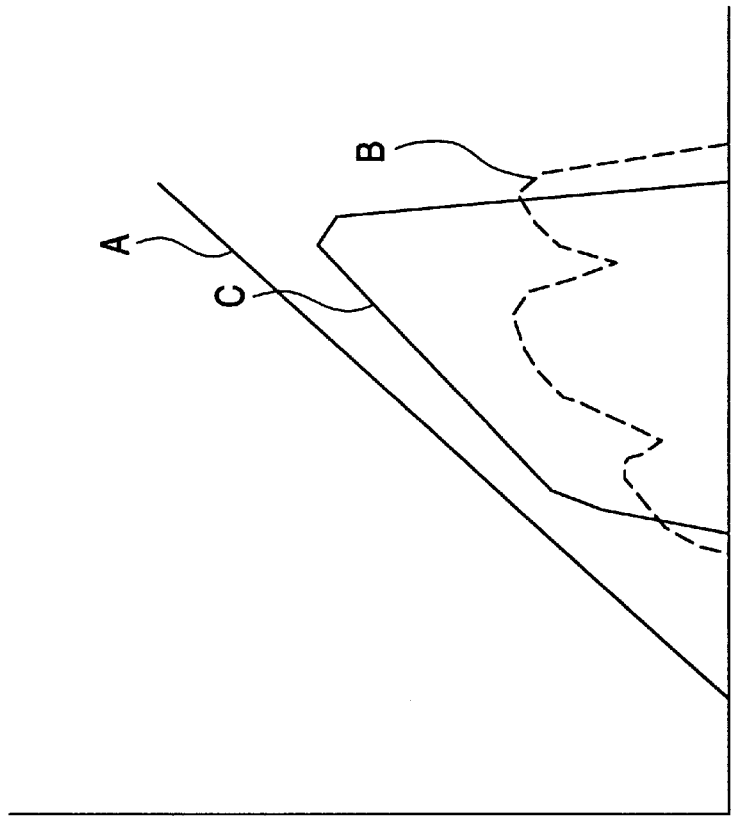

THE BEAM DIAMETER OF
A SOLID-STATE ELEMENT
(mm)

THE OUTPUT OF AN EXCITATION LIGHT SOURCE (W)

THE BEAM DIAMETER OF
A SOLID-STATE ELEMENT
(mm)

THE OUTPUT OF AN EXCITATION LIGHT SOURCE (W)

SOLID STATE LASER OSCILLATOR AND MACHINING APPARATUS USING THE SAME

BACKGROUND OF THE INVENTION

The present invention relates to a solid-state laser oscillator which can stably generate a laser beam with a high power output and exhibiting a high quality factor (Q), and a machining apparatus using the same.

FIG. 5 is a schematic view showing the configuration of an oscillator section of a conventional solid state laser device which has been used to oscillate a laser beam with high quality (Q). In FIG. 5, reference numeral 1 denotes a rod-like solid-state element (host), e.g., a yttrium aluminum garnet (YAG) crystal doped with neodymium (Nd), i.e., Nd:YAG laser. Reference numeral 2 denotes an excitation light source, e.g., Krypton arc lamp, Xenon flash lamp, etc. Reference numeral 4 denotes a condenser formed so as to enclose the solid-state element 1 and excitation light source 2. Numeral 31 denotes a partial reflecting mirror and numeral 32 denotes a total reflecting mirror.

FIG. 6 is a sectional view of a laser oscillator which is directed to the prior art for stabilizing a laser oscillator with high quality Q as disclosed in Solid-State Laser Engineering, 2nd Edition, Springer-Veralag, pp. 192 to 193. Reference numerals 11 and 12 denote first and second rod-like solid-state elements, respectively, and reference numerals 21 and 22 denote first and second excitation light sources, respectively. Reference numeral 31 denotes a partial reflecting mirror; 32 a total reflecting mirror; 60 a 90° crystal optical rotator; and 61 a Brewster window.

Referring to FIG. 5, a conventional laser oscillator is described as follows. It is well known that the quality of a laser beam improves as the ratio of a beam in a solid-state element to that of a Gaussian beam calculated theoretically in the solid-state element decreases. To increase the laser output, the length of the resonator can be increased, or an aperture can be made in the resonator to restrict oscillation to the lowest order of transverse mode ($TM_{00}$) in the solid-state laser cavity, and thereby obtain a high Q. An "offset" laser resonator can be employed to boost output power and energy by using a reflecting mirror with a small radius of curvature, e.g., 1 m or less, typically 0.1–0.5 m, where the laser beam is converged to a small spot at the front surface of the reflecting mirror. A convex partial reflecting mirror can also be arranged in the vicinity of the solid-state element to form a reflecting mirror, increasing the effective length of the laser cavity by substantially several meters, taken together with a convex thermal lens effect produce by the solid-state element.

In an experiment by the inventors of the present invention, where the resonator was structured as above, such that the diameter of the Gaussian beam theoretically calculated in the vicinity of the solid-state element was increased to, e.g., about ⅕ the diameter of the solid-state element, a laser beam with high quality (Q) could be obtained that was about 1/20 the refraction limit, i.e., a transverse mode order of about 20 that is about 1/10 that of a normal laser oscillator.

However, this resonator structure has the problem in that it gave rise to a reduction of oscillation efficiency and fluctuation in the laser output. This is notable in the case where the resonator is operated with a high output of 100 W or larger, in which distortion of the solid-state element is increased. This tendency to distortion is noticeable as the quality of the beam is increased.

FIG. 7 graphically shows one example of the oscillation characteristic acquired in an experiment on the conventional solid-state laser oscillator. In the graph, line A illustrates the oscillation characteristic of a laser beam with poor beam quality, e.g., about 1/200 times a theoretical limit, i.e., having the transverse mode order of 200, and line B illustrates that of a laser beam with high beam quality having the transverse mode order of 20. The line B does not exhibit a linear oscillation characteristic but a curved characteristic including several peaks. It can be seen that the fluctuation of the output is notable at the sections where there are valleys in the oscillation curve, i.e., under the condition where the output is relatively low.

On the other hand, in the prior art shown in FIG. 6, it is known that with a first and a second rod-like solid-state element 11 and 12 arranged in tandem, and a 90° crystal rotator 60 located at the center between these solid-state elements, if the incidence of birefringence generated by the first solid-state element is canceled out by the second solid-state element, a laser beam with a stabilized output and with high efficiency can be obtained. Specifically, birefringence refers to the effect of causing two polarization components orthogonal to each other to discern different refractive indices owing to thermal stress generated in the solid-state element. Thus, the laser beam incident on the birefringent solid-state element will discern either one of two kinds of thermal lenses according to its polarization direction.

The 90° crystal rotator 60 rotates the polarized light of the laser beam which has permeated through the first solid-state element 11, and causes it to be incident on the second solid-state element 12. Thus, the laser beam incident on the first solid-state element 11 equally discerns two kinds of thermal lenses when it has passed through both solid-state elements. Accordingly, with the laser beam polarized in either polarization direction, and with birefringence being exhibited by both the solid-state elements, the laser beam discerns both thermal lenses in combination of the two solid-state elements, and two polarized beams oscillate under substantially the same conditions to provide an effect as if the separation of polarized light by birefringence of the solid-state elements has been canceled out.

The prior art shown in FIG. 6 was designed to drive a linear polarized light efficiently and stably. In addition, according to the experiment carried out by the inventors of the present invention, it was also confirmed that in a resonator in which linear polarized light is not the objective and a Brewster window is not present, careful insertion of a 90° crystal rotator 60 between two solid-state elements 11 and 12 to cancel the influence of birefringence can improve the efficiency of the laser oscillation. The oscillation characteristic illustrated by curve C as shown in FIG. 7, provides an oscillation waveform with no substantial fluctuation.

A theoretical explanation follows regarding the difference between the prior art shown in FIGS. 5 and 6. First, in the prior art shown in FIG. 5, the solid-state element is excited by the environment and becomes thermally deformed. For example, the solid-state element with a circular section provides a difference in extension of the crystal and change in the refractive index between a diameter direction and a radial direction of the section. The directions of the two extensions are orthogonal to each other, to provide two lens functions in the respective directions. Therefore, the laser beams having two basic polarization modes; i.e., polarization components shown in FIGS. 8A and 8B, are subjected to different dimensions of lens function when they pass through the solid-state element. For this reason, the diameters of the Gaussian beam theoretically calculated within the solid-state element, for the output of an excitation light source, can be plotted as two curves of B1 and B2, as shown in FIG. 9B, for the laser beams having the basic polarization modes shown in FIGS. 8A and 8B. The section represented by the two curves with diameters B1 and B2 of the Gaussian beam, is an area where oscillation can occur, which can be calculated for the respective basic polarization modes. In the other area, oscillation does not occur owing to great losses in the resonator.

A comparison between the oscillation characteristic represented by curve B in FIG. 7 and the oscillation area shown in FIG. 9B, shows experimentally that the oscillation characteristic shown by curve B in FIG. 7 has three outputs with peaks whose sections are coincident to oscillation areas B11, B12 and B22 in FIG. 9B. This means that a high output and resonator stability can be obtained only under the condition where two polarization mode beams oscillate in a completely overlapping manner, or where only one polarization mode oscillates stably whereas the other polarization mode is located in an unstable oscillation area. This is attributable to the following fact.

For example, under the boundary condition between B11 and B12 in FIG. 9B, transition from the basic polarized light mode to the other polarized light mode, occurs owing to fluctuation or non-uniformity of distortion of the thermal lens in the solid-state element. Thus, resonation in the polarization mode, with great laser cavity losses, also partially occurs so that gains by the solid-state elements can be canceled out by each other. As a result, the resonator losses are increased to lower the laser output and make the resonator unstable.

On the other hand, in the prior art shown in FIG. 6, the oscillator conducts the polarization conversion by means of a polarized rotator (90° crystal rotator 60) inserted between the two solid-state elements 11 and 12, thereby canceling any difference between the resonating modes in the two kinds of polarization modes. The oscillation area results as shown in FIG. 9A. The oscillation areas A1 and A2 in both polarization modes substantially overlap each other. In this way, both polarization modes uniformly oscillate with low cavity losses so that a stabilized oscillation can be obtained with a high efficiency, as shown in curve C in FIG. 7.

As described above, in the prior art, in order to improve the quality of a laser beam, the oscillator was so configured that the ratio of the diameter of the beam in a solid-state element to that of a Gaussian beam theoretically calculated in a solid-state element, was small. But at a high laser output of 100 W or more, the oscillation efficiency would deteriorate and the output would fluctuate due to birefringence. Further, in order to obviate such a disadvantage, a technique for canceling out the effects of birefringence by inserting a crystal rotator between two solid-state elements arranged in tandem, was adopted. But, for this purpose, two solid-state elements having substantially the same quality were required, and a technique of accurately arranging the solid-state elements on an optical axis was also required.

SUMMARY OF THE INVENTION

The present invention was designed to solve the above problems and provides a solid-state laser oscillator which can maintain a laser beam with high quality (Q) at a high output, even when there is only a single rod-like solid-state element.

Further, the present invention provides a machining apparatus using such a high-performance solid-state laser oscillator.

The resonating solid-state laser oscillator according to the present invention includes a solid-state element containing a laser active medium and providing a plurality of thermal lenses in excitation; and reflecting mirrors arranged oppositely to each other on both sides of the solid-state element so that their optical axes are coincident to each other, wherein a prescribed relationship is given among the refractive coefficient and length of the solid-state element, the radii of curvature of the reflecting mirrors, the distance between the reflecting mirrors and the solid-state element, and the difference between 1/f of the plurality of thermal lenses owing to the birefringence of the solid-state element, so that oscillation areas, due to the plurality of thermal lenses, are separated from each other.

The solid-state element is structured in the form of a rod-like YAG solid-state element.

The prescribed relationship is such that the thermal lens ranges providing oscillation are not larger than 20% of the center value of the plurality of thermal lenses.

The machining apparatus using the solid-state laser oscillator uses a solid-state laser oscillator including a solid-state element containing a laser active medium and providing a plurality of thermal lenses in excitation; and reflecting mirrors arranged oppositely to each other on both sides of the solid-state element so that their optical axes are coincident to each other, wherein a prescribed relationship is given among the refractive index and length of the solid-state element, the radii of curvature of the reflecting mirrors, the distance between the reflecting mirrors and the difference between 1/f of the plurality of thermal lenses owing to the birefringence of the solid-state element such that oscillation areas, due to the plurality of thermal lenses, are separated from each other. The laser oscillator uses a solid-state laser oscillator using a rod-like YAG solid-state element, or uses a solid-state laser oscillator in which the above prescribed relationship is such that the thermal lens ranges generating oscillation are not larger than 20% of the center value of the plurality of thermal lenses.

BRIEF DESCRIPTION OF THE DRAWNIGS

FIG. 7 is a graph showing the oscillation characteristic according to the prior art.

DETAILED DESCRIPTION OF THE PREFERRED EMBODIMENTS (Embodiment 1)

Figure 1:
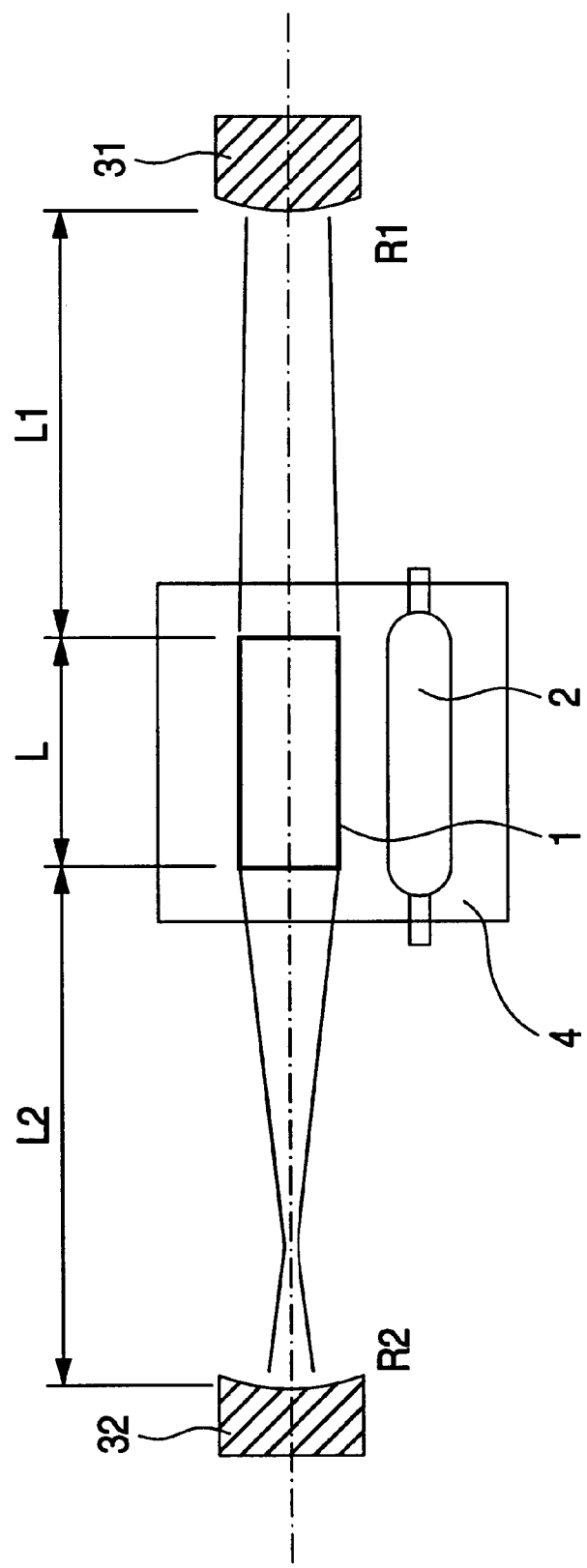
FIG. 1 is a schematic view showing the configuration of the oscillator portion, according to a first embodiment of the present invention.
Figure 2A:
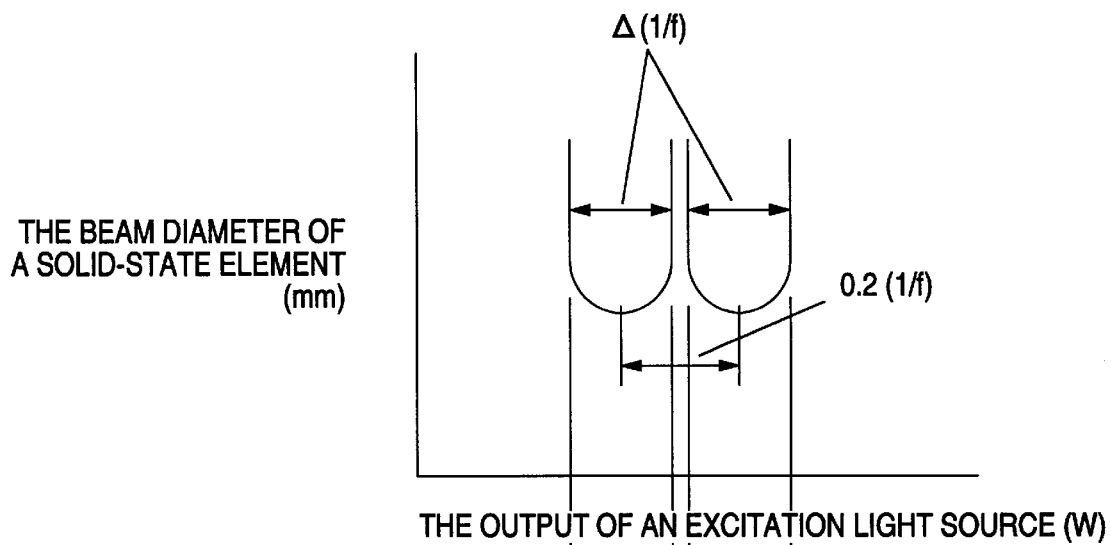
FIGS. 2A and 2B are graphs showing the oscillating area and the oscillating characteristic, according to the first embodiment of the present invention.
Figure 2B:
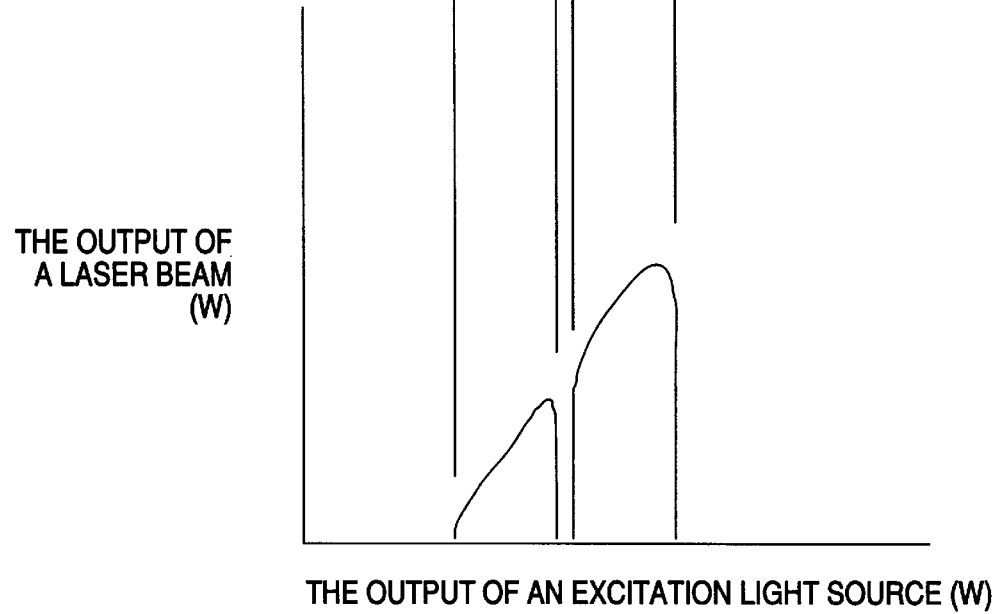
Figure 3:
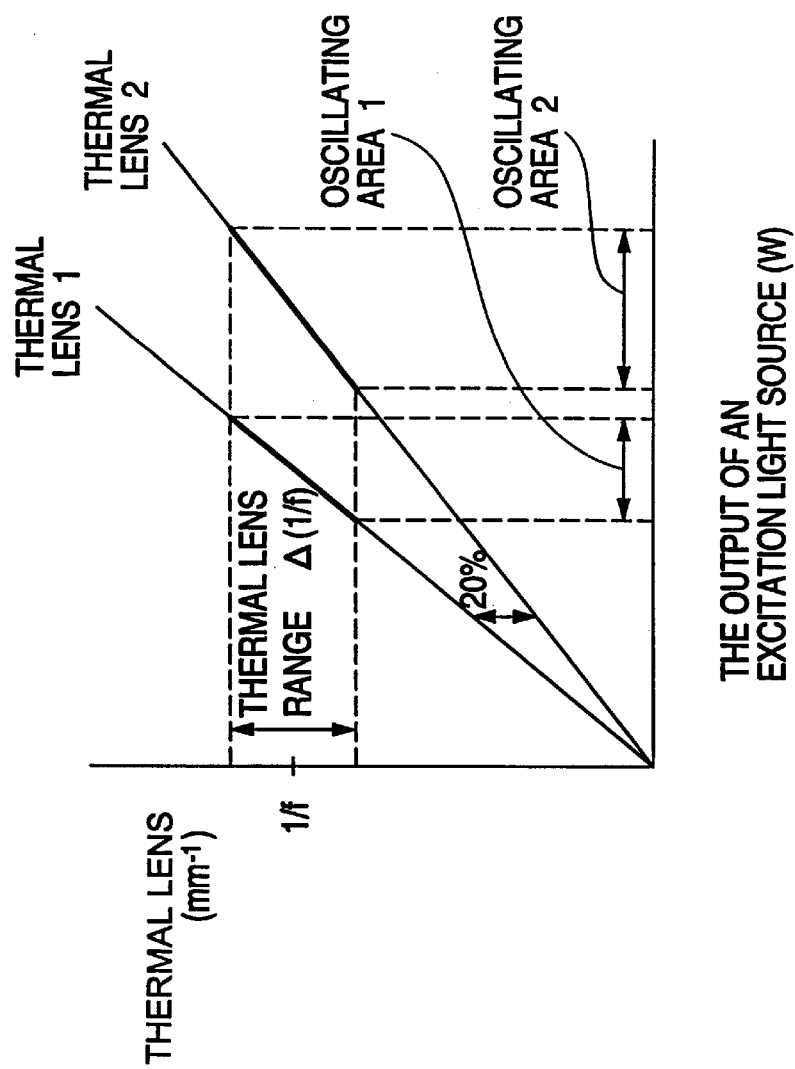
FIG. 3 is a graph showing a relationship between the thermal lens of an oscillator and an excitation light source output, according to the first embodiment of the present invention.

Now referring to FIGS. 1 to 3, an explanation of the first embodiment follows. FIG. 1 depicts the schematic arrangement of an oscillator section according to the first embodiment of the present invention. Reference numerals 1, 2 and 4 refer to like elements of the prior art in FIG. 5. This embodiment is different from the prior art of FIG. 5 in that the respective curvatures R1 and R2 and the distances L1 and L2 from the end of the solid-state element 1 of a partial reflection mirror 31 and a full-reflection mirror 32, satisfy certain conditions.

In the oscillator, which includes a solid-state element 1 whose thermal lens changes according to an input (i.e., output from an excitation light source), a range $\Delta 1/f$ exists for the oscillatable solid-state element. The range $\Delta 1/f$ of the thermal lens is correlated with the dimension of the resonator. If a mirror with a shorter radius of curvature is used to increase the length of the resonator, the range of the thermal lens will be decreased.

Figure 5:
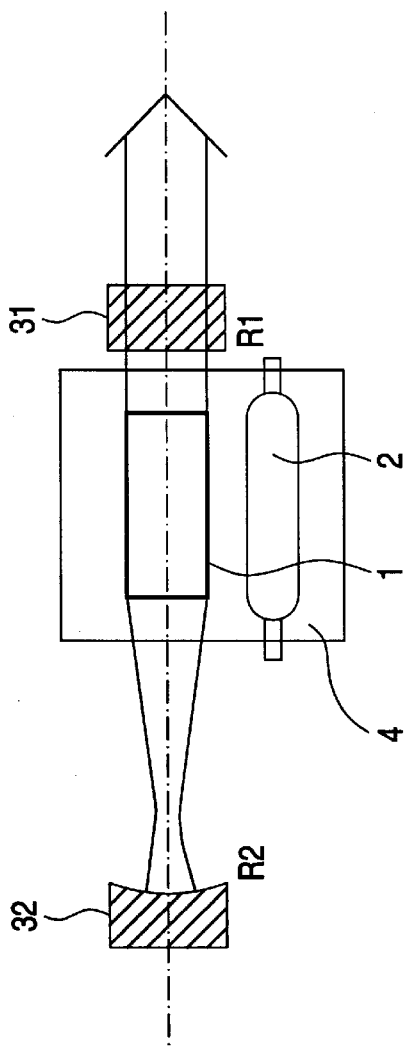
FIG. 5 is a view showing the configuration of the oscillator section, according to a prior art.

On the other hand, since the birefringent solid-state element exhibits values (1/f) for different thermal lenses for different polarization modes, in the prior art of FIG. 5, the two beams in the two polarization modes start to oscillate at different excitation light source outputs, such that an output characteristic, as shown by curve B in FIG. 7, results. The ranges of excitation light source outputs corresponding to stable oscillations in the polarization modes are referred to as "oscillation areas". In this state, two oscillation regions half overlap each other such that selectivity of the polarization mode is poor and the laser output is unstable. Therefore, if the width of the oscillation region is narrowed to decrease the overlap of the oscillation areas in the two polarization modes, as the width of the oscillation area is narrowed halfway, the cavity losses of oscillation increase so that instability increases. But, when the width of the oscillation region is narrowed sufficiently to separate the oscillation areas in the two polarization modes from each other, a condition appears abruptly under which a laser output with high efficiency oscillates with a small cavity loss.

Figure 6:
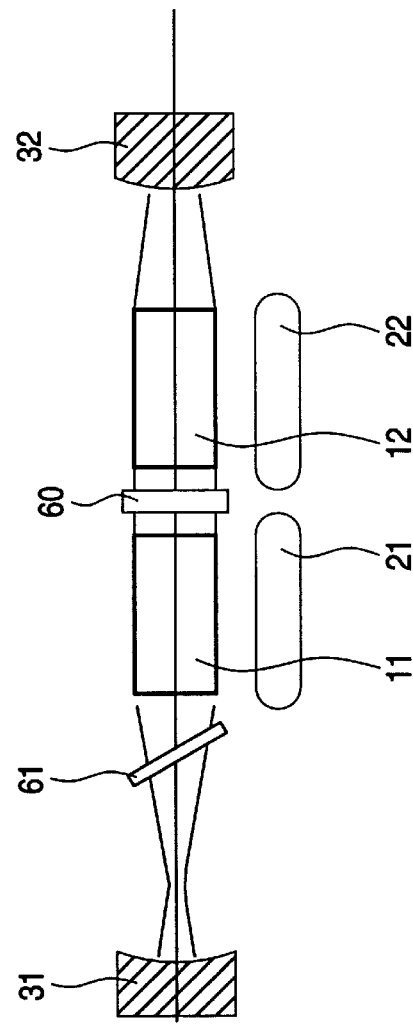
FIG. 6 is a view showing the configuration of the oscillator section, according to another prior art.
Figure 8A:
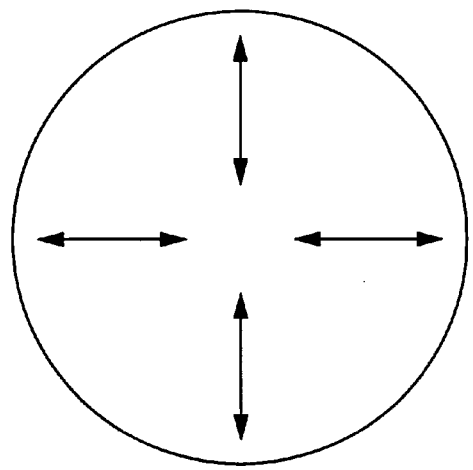
FIGS. 8A and 8B are views showing the polarization characteristic of the oscillator section, according to the prior art.
Figure 8B:
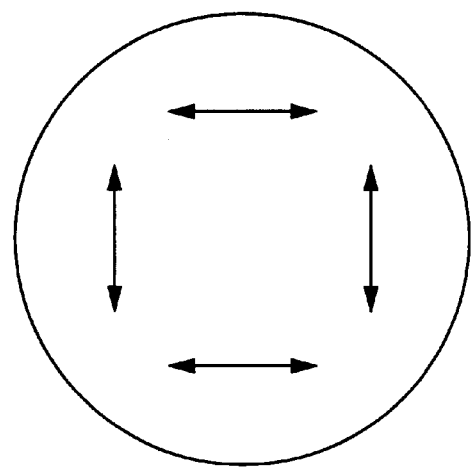
Figure 9A:
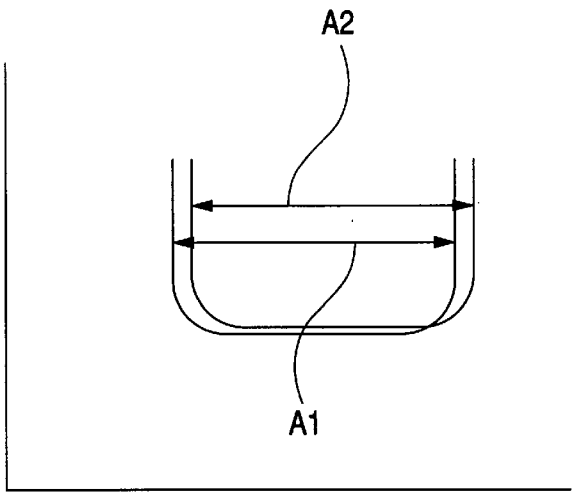
FIGS. 9A and 9B are graphs showing the oscillating area according to the prior art.
Figure 9B:
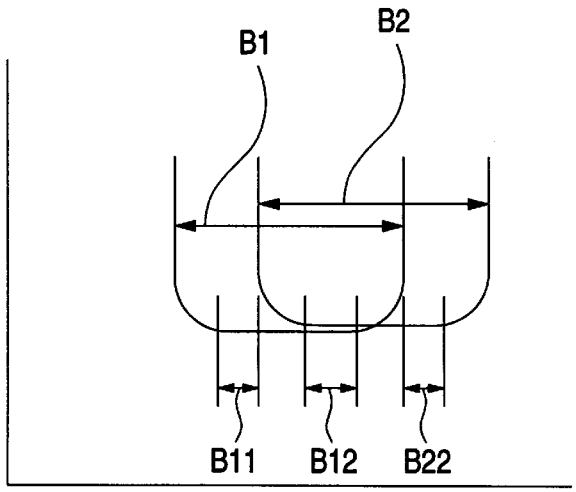

The oscillation area and oscillation characteristic are shown in the graphs of FIGS. 2A and 2B. The oscillation region is divided into two areas. The widths of the respective oscillation areas are narrowed as compared with the curves B and C exhibiting the oscillation characteristics as shown in FIG. 7. But, at the output peaks in the respective oscillation areas, stabilized outputs with very high efficiency can be obtained. The reason for this is as follows. Since the oscillation areas in the two polarization modes are completely separated from each other, selectivity for the one polarization mode is sufficiently raised even when instability for the solid-state element is considered. As a result, the gain of the solid-state element is stably concentrated on the one polarization mode. This method is opposite to the prior art of FIG. 6 in which oscillation areas in both polarization modes are made to coincide completely with each other to stabilize the laser output.

In FIG. 2A, the width between two oscillation areas is expressed as $\Delta(1/f)$ for the reason that the output of an excited light source is in a relationship of 1:1 with the value of (1/f).

For example, in the case of a rod-type YAG laser, in an experiment by the inventors of the present invention, the difference in the thermal lens (1/f), which is a reciprocal of the focal distance between two polarization modes, was about 20% of the thermal lens (1/f). The oscillator oscillating in a more narrow thermal lens than the difference in 1/f of the thermal lens, is actually structured in such a manner that one resonator mirror is separately arranged at a very short radius of curvature R1=100 mm, and a very short distance from the end of a solid-state element of L1=450 mm, whereas the other resonator mirror is arranged at R2=−1000 mm and L2=550 mm, thus making laser oscillation in the range of about 240 to 280 mm of the focal distance (f) of the thermal lens of the solid-state element.

In this oscillator, therefore, the center of the thermal lens $(1/f)=1/260\,(\text{mm}^{-1})$ so that the thermal lens difference which is about 20% of this value is $0.2\,(1/f)=0.00077\,(\text{mm}^{-1})$ On the other hand, the range of the oscillating thermal lens is $1/240-1/280=0.00060\,(\text{mm}^{-1})$ In this way, the range of the oscillating thermal lens is more narrow than the thermal lens difference in 1/f of the solid-state element, so that the oscillating areas corresponding to the respective polarization modes are separated.

The above fact will be explained with reference to the graph showing a relationship between a thermal lens (1/f) and the excitation output (W) of an excitation light source, as shown in FIG. 3. For example, where two thermal lenses (i.e., thermal lens 1 and thermal lens 2) are mixedly present, for the thermal lens range ($\Delta(1/f)$) centered at a certain lens (1/f), oscillating areas are set such that the oscillating area #1 generated by thermal lens 1 and the oscillating area #2 generated by the thermal lens 2, do not overlap each other. It can be seen that the difference between the thermal lens 1 and the thermal lens 2 is 20% of (1/f).

An analytical explanation will be given of the condition of such a resonator. In this resonator, in order to separate the oscillating areas corresponding to the respective polarization modes completely from each other, it is necessary that the widths of the respective oscillating areas are more narrow than the difference between the oscillation areas in the two polarization modes. It is known that the relationship between the width of the oscillating area and the size of the resonator can be calculated as follows on the basis of a report by V. Magni et al.

Assuming that the focal distance of the thermal lens of the solid-state element is f, the width of the oscillating area evaluated in terms of a thermal lens range $\Delta(1/f)$ can be expressed as follows, using design values R1, R2, L1 and L2 of the resonator in FIG. 1, and the length L of the solid-state element and a refractive index nO:

$$\Delta(1/f)=1/(\max(|u1|,|u2|))$$

where $u1=(L1+L/2\cdot nO)(1-(L1+L/2\cdot nO)/R1)$
$u2=(L1+L/2\cdot nO)(1-(L2+L/2\cdot nO)/R2)$ It is assumed that the center value of the thermal lens of the solid-state element where the oscillator oscillates is 1/f (when the minimum value of the thermal lens is 1/f1 and the maximum value thereof is 1/f2, $1/f=(1/f1+1/f2)/2$), it is required that the thermal lens range ($\Delta(1/f)$) for providing the desired oscillation, is more narrow than this value. As a result, the condition for the resonator is:

$$1/(\max(\max(|u1|,|u2|))\leq 0.2(1/f)$$

The dimensions of R1, R2, L1 and L2 of the resonator may be determined in order to satisfy this condition.

Further, on the assumption that $|u1| \geq |u2|$, the condition of the above resonator can be simplified as follows.

$$R1 \geq (L1+L/2 \cdot nO)^2/(L1+L/2 \cdot nO-f/0.2)$$

On the other hand, on the assumption that $|u1| \geq |u2|$, the condition of the above resonator can be simplified as follows.

$$R2 \geq (L2+L/2 \cdot nO)^2/(L2+L/2 \cdot nO-f/0.2)$$

As described above, since an oscillator is so configured that a prescribed relationship is given among the refractive index nO and length L of the solid-state element, radii of curvature R1, R2 of the reflecting mirrors, the distances L1, L2 between the reflecting mirrors and the solid-state element and the difference between 1/f of a plurality of thermal lenses owing to birefringence of the solid-state element (e.g., 0.2 (1/f) in the case of rod-like YAG laser), two oscillating areas can be separated from each other. Thus, the polarization mode of the laser beam during oscillation is limited to either one of the thermal lens ranges. This improves selectivity of the polarization mode to provide a laser beam having a stabilized output with a high quality and a high efficiency, even with a low order mode.

The YAG solid-state element does not provide as large a birefringence as compared with other solid-state elements. For this reason, the rod-shape of this element increases the thermal lens difference so that the oscillating areas can easily be separated from each other, thus providing a more preferable result.

(Embodiment 2)

Figure 4:
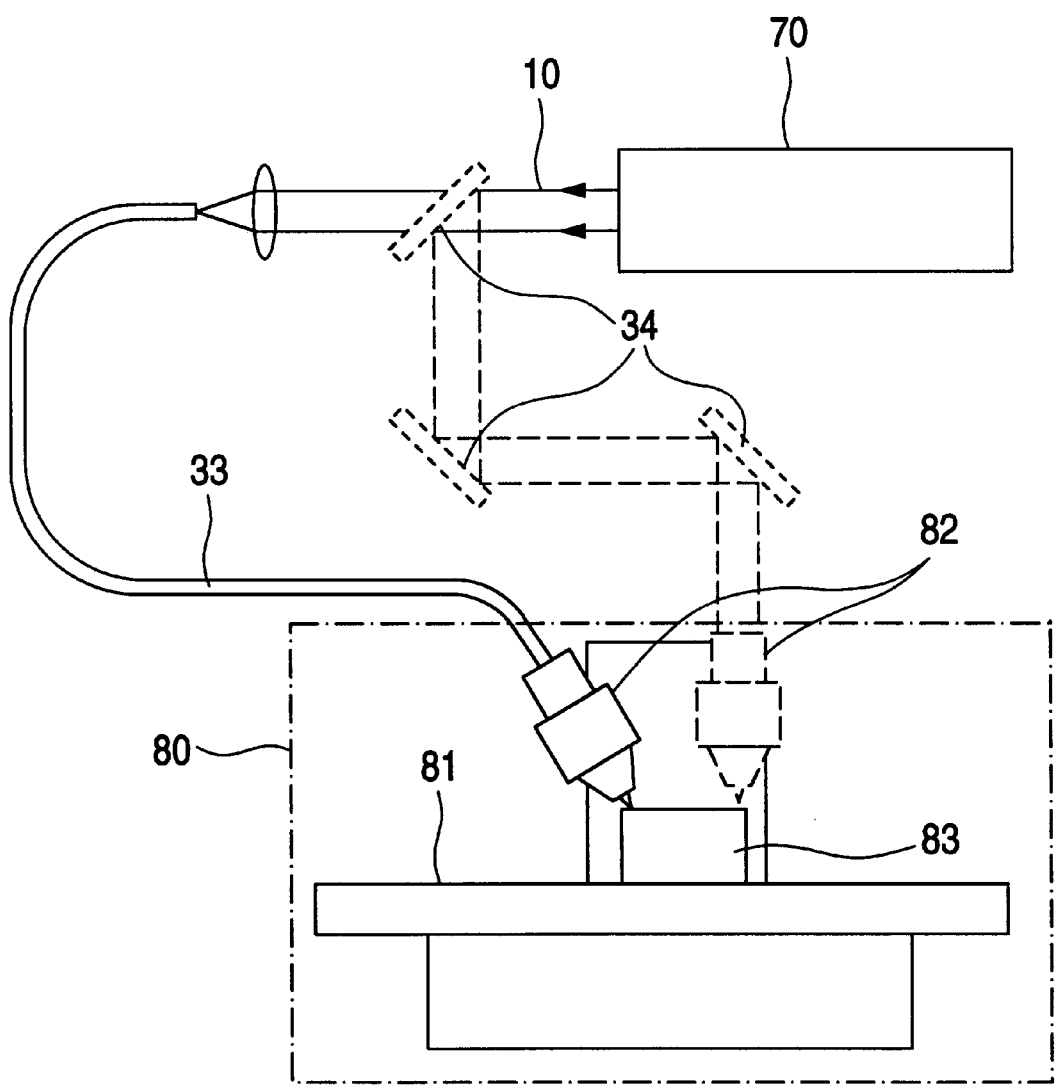
FIG. 4 is a view showing the arrangement of a machining apparatus using the solid-state laser oscillator, according to the second embodiment.

Now referring to FIG. 4, an explanation follows regarding one embodiment in which the solid-state laser oscillator, satisfying the condition of the resonator, is applied to a machining apparatus. In FIG. 4, reference numeral 70 denotes a solid-state laser oscillator depicted with reference to the first embodiment; 80 a machining apparatus for laser machining, including a machining table 81 and a machining head 82. A high quality laser beam is emitted from the solid-state laser oscillator 70. The laser beam 10 is guided to a machining head 82 by e.g., an optical fiber 33 or bend mirror 34 and focused on a machining workpiece 83. The machining workpiece 83 is fixed on the machining table 81. The machining head 82 or machining table 81 is operated to perform the laser machining such as cutting, welding, marking, etc.

The present invention, which has been configured as described above, provides the following effects as described below.

The resonating solid-state laser oscillator according to the present invention includes a solid-state element containing a laser active medium and providing a plurality of thermal lenses during excitation; reflecting mirrors arranged oppositely to each other on both sides of the solid-state element so that their optical axes are coincident to each other, wherein a prescribed relationship is given among the refractive index and length of the solid-state element, the radii of curvature of the reflecting mirrors, the distance between the reflecting mirrors and the solid-state element, and the difference between 1/f of the plurality of thermal lenses owing to birefringence of the solid-state element so that oscillation areas due to the plurality of thermal lenses are separated from each other. Thus, the polarization mode of the laser beam during oscillation is limited to either one of the thermal lens ranges. This improves selectivity of the polarization mode to provide a laser beam having a stabilized output with high quality and high efficiency even with a low order mode.

The solid-state element is formed in a rod-shape YAG solid-state element. For this reason, in the YAG solid-state element having a small birefringence, the rod-shape of this element increases the thermal lens difference ($\Delta 1/f$) so that the oscillating areas can easily be separated from each other. This improves selectivity of the polarization mode to provide a laser beam having a stabilized output with high quality and high efficiency even with a low order mode.

Further, the predetermined relationship is set so that the thermal lens ranges generating oscillation are less than 20% of the center value of the plurality of thermal lenses. Thus, the polarization mode of the laser beam during oscillation is limited to either one of the thermal lens ranges. This improves selectivity of the polarization mode to provide a laser beam having a stabilized output with high quality and high efficiency even with a low order mode.

The machining apparatus using the solid-state laser oscillator uses a solid-state laser oscillator including a solid-state element containing a laser active medium and providing a plurality of thermal lenses in excitation; and reflecting mirrors arranged oppositely to each other on both sides of the solid-state element so that their optical axes are coincident to each other, wherein a prescribed relationship is given among the refractive index and length of the solid-state element, the radii of curvature of the reflection mirrors, the distance between the reflecting mirrors and the solid-state element, and the difference between 1/f of the plurality of thermal lenses owing to birefringence of the solid-state element, so that oscillation areas due to the plurality of thermal lenses are separated from each other. The machining apparatus uses a solid-state laser oscillator using a rod-like YAG solid-state element, or uses a solid-state laser oscillator configure according to the above prescribed relationship whereby the thermal lens ranges generating oscillation are not larger than 20% of the center value of the plurality of thermal lenses. Thus, the solid-state laser oscillator which generates the laser beam providing a stabilized output with a high quality and a high efficiency, is installed into the solid-state oscillator so that the apparatus can be easily adjusted and the quality of machining can be improved.

What is claimed is:

1. A resonating solid-state laser oscillator comprising:
   an excitation light source producing an output that has plural polarization modes and that lies within an output range;
   a birefringent solid-state element including a laser active medium and producing differing thermal lens effects in accordance with the polarization modes of the output of said excitation light source; and
   reflecting mirrors arranged on opposite sides of said solid-state element, so that optical axes of said reflecting mirrors are coincident,
   wherein:
     said oscillator oscillates in plural oscillation areas within the output range,
     the plural oscillation areas correspond respectively to the plural thermal lens effects, and
     the plural oscillation areas are prevented from overlapping through appropriate selection of the following parameters:
       a refractive index and a length of said solid-state element,
       radii of curvature of said reflection mirrors,
       respective distances between said solid-state element and said reflecting mirrors, and
       $|1/f'-1/f|$, where f' is a focal length corresponding to one of the thermal lens effects and f is a focal length corresponding to another of the thermal lens effects.

2. The resonating solid-state laser oscillator of claim 1, wherein said solid-state element is a shaped YAG solid-state element.

3. The resonating solid-state laser oscillator of claim 2, wherein the selection of the parameters provides a separation between the oscillation areas such that $|1/f'-1/f|$ is less than $(0.4/(f'+f))$.

4. The resonating solid-state laser oscillator of claim 1, wherein the selection of the parameters provides a separation between the oscillation areas such that $|0.1/f'-1/f|$ is less than $(0.4/(f'+f))$.

5. A machining apparatus comprising:
   a machining head outputting a laser beam;
   an optical path for guiding the laser beam to said machining head; and
   a solid-state laser oscillator, said oscillator comprising:
      an excitation light source producing an output that has plural polarization modes and that lies within an output range;
      a birefringent solid-state element including a laser active medium and producing differing thermal lens effects in accordance with the polarization modes of the output of said excitation light source; and
      reflecting mirrors arranged on opposite sides of said solid-state element, so that optical axes of said reflecting mirrors are coincident,
   wherein:
      said oscillator oscillates in plural oscillation areas within the output range, the plural oscillation areas correspond respectively to the plural thermal lens effects, and the plural oscillation areas are prevented from overlapping through appropriate selection of the following parameters:
         a refractive index and a length of said solid-state element, radii of curvature of said reflection mirrors, respective distances between said solid-state element and said reflecting mirrors, and
         $|1/f'-1/f|$, where f' is a focal length corresponding to one of the thermal lens effects and f is a focal length corresponding to another of the thermal lens effects.

* * * * *